(12) United States Patent
Yano et al.

(10) Patent No.: US 9,596,010 B2
(45) Date of Patent: Mar. 14, 2017

(54) WIRELESS COMMUNICATION APPARATUS AND WIRELESS COMMUNICATION METHOD

(71) Applicant: HITACHI KOKUSAI ELECTRIC, INC., Tokyo (JP)

(72) Inventors: Takashi Yano, Tokyo (JP); Keisuke Yamamoto, Tokyo (JP)

(73) Assignee: HITACHI KOKUSAI ELECTRIC, INC., Tokyo (JP)

(*) Notice: Subject to any disclaimer, the term of this patent is extended or adjusted under 35 U.S.C. 154(b) by 0 days.

(21) Appl. No.: 14/890,671

(22) PCT Filed: May 13, 2014

(86) PCT No.: PCT/JP2014/062675
§ 371 (c)(1),
(2) Date: Nov. 12, 2015

(87) PCT Pub. No.: WO2014/185395
PCT Pub. Date: Nov. 20, 2014

(65) Prior Publication Data
US 2016/0094281 A1   Mar. 31, 2016

(30) Foreign Application Priority Data

May 13, 2013 (JP) .................. 2013-100849

(51) Int. Cl.
*H04B 7/02* (2006.01)
*H04B 7/04* (2006.01)
(Continued)

(52) U.S. Cl.
CPC ............. *H04B 7/0413* (2013.01); *H04B 7/04* (2013.01); *H04B 7/0854* (2013.01);
(Continued)

(58) Field of Classification Search
CPC H04B 7/0413; H04B 1/7107; H04B 1/71072; H04B 7/0854; H04W 72/082;
(Continued)

(56) References Cited

U.S. PATENT DOCUMENTS 8,503,579 B2 * 8/2013 Furukawa ........... H04L 25/0216
375/340
2010/0272220 A1 * 10/2010 Murai .................. H04B 7/0413
375/346
(Continued)

FOREIGN PATENT DOCUMENTS

JP    2010-147946 A    7/2010

OTHER PUBLICATIONS

Higuchi et al., "Multi-Antenna Wireless Transmission Technology 3 Signal Separation Technology in Multiplex Method", NTT DoCoMo Technical Journal, vol. 14, No. 1, pp. 66-75, Apr. 2006.
Foschini, "Layered Space-Time Architecture for Wireless Communications in a Fading Environment When Using Multi-Element Antennas," Bell Labs Technical Journal, Autumn 1996.
Brink et al., "Design of Low-Density Parity-Check Codes for Modulation and Detection," IEEE Transactions on Communications, vol. 52, No. 4, pp. 670-678, Apr. 2004.
Yano et al., "Arithmetic Extended-Mapping for BICM-ID with Repetition Codes", Proceedings 2009 International ITG Workshop on Smart Antennas (WSA 2009), pp. 304-311, Feb. 2009.
(Continued)

*Primary Examiner* — Janice Tieu
(74) *Attorney, Agent, or Firm* — Volpe and Koenig, P.C.

(57) ABSTRACT

In a capacity region of a multiple access channel which is a theoretical limit, a combination of transmission speeds that are equal between the channels is realized. A wireless communication apparatus receives first to third frames, which are sequentially transmitted. The second frame is transmitted at a head time different from that of the first and third frames, and the second frame receives a first signal which is temporally superposed to both the first and third frames. A replica signal of the first frame is generated based on the result obtained by demodulating the first frame, and a second signal which is obtained by canceling it from the first signal is generated. The second frame is demodulated by using the second signal, and the interference from the first (Continued)

frame in the second frame in the second signal is canceled, and the interference from the third frame remains.

10 Claims, 17 Drawing Sheets

(51) Int. Cl.
| | | |
|---|---|---|
| *H04W 72/08* | (2009.01) | |
| *H04B 7/08* | (2006.01) | |
| *H04B 1/7107* | (2011.01) | |
| *H04L 25/03* | (2006.01) | |
| *H04L 1/00* | (2006.01) | |
| *H04J 11/00* | (2006.01) | |

(52) U.S. Cl.
CPC ......... *H04W 72/082* (2013.01); *H04B 1/7107* (2013.01); *H04B 1/71072* (2013.01); *H04J 11/004* (2013.01); *H04L 1/0048* (2013.01); *H04L 2025/03426* (2013.01)

(58) Field of Classification Search
CPC .......... H04L 1/0048; H04L 2025/03426; H04J 11/004
See application file for complete search history.

(56) References Cited

U.S. PATENT DOCUMENTS

| | | | |
|---|---|---|---|
| 2011/0116581 A1* | 5/2011 | Yamada | ............... H04B 7/0413 |
| | | | 375/341 |
| 2015/0171983 A1* | 6/2015 | Kusashima | ............ H04J 11/004 |
| | | | 370/329 |

OTHER PUBLICATIONS

Takeda et al., "Comparison of User Throughput Between Orthogonal Access and Non-Orthogonal Access with MMSE-SIC in Cellular Uplink with Multiple Receiver Antennas", IEICE Technical Report, Nov. 9, 2011 (Nov. 9, 2011), RCS2011-225.

Bresler et al., "The Two-User Gaussian Interference Channel: A Deterministic View", European Transactions on Telecommunications, Apr. 9, 2008.

Toto-Zaeasoa et al., "Rate-Adaptive Codes for the Entire Slepian-Wolf Region and Arbitrarily Correlated Sources", Acoustics, Speech and Signal Processing, 2008. ICASSP 2008. IFEE International Conference on, pp. 2965-2968, Apr. 4, 2008.

* cited by examiner

WIRELESS COMMUNICATION APPARATUS AND WIRELESS COMMUNICATION METHOD

TECHNICAL FIELD

The present invention relates to a wireless communication apparatus and a wireless communication method, and specifically, to a wireless communication apparatus and a wireless communication method for concurrently transmitting signals from a plurality of antennae.

BACKGROUND ART

A multiple input, multiple output (MIMO) system has been widely known as a background art in this technical field. The MIMO system is a technique for separating transmission signals by transmitting/receiving signals from/by a plurality of antennae. As a signal demodulation method in the MIMO communication system, successive interference cancelation (SIC) has been known.

For example, NPL 1 discloses a technique in which a first transmission signal is demodulated and decoded from a reception signal and a reception signal replica of the first transmission signal is generated from the decoding result and the reception signal replica is canceled from the reception signal so that a spatial multiplexed second transmission signal and signals after that are demodulated with high accuracy.

Also, NPL 2 discloses a technique called bell labs layered space-time (BLAST). In the BLAST, a transmission side sequentially performs transmission while cyclically switching transmission antennae and a reception side demodulates a signal transmitted from a first antenna and a replica of the signal transmitted from the first antenna is generated based on the demodulation result and the replica is canceled from the reception signal. Accordingly, a signal transmitted from a second antenna and signals after that are demodulated with high accuracy.

CITATION LIST

Non-Patent Literatures

NPL 1: Kenichi HIGUCHI et al., "Multi-antenna wireless transmission technology 3 signal separation technology in multiplex method", NTT DoCoMo Technical Journal, Vol. 14, No. 1, pp. 66-75, April 2006.
NPL 2: Gerard J. Foschini, "Layered space-time architecture for wireless communications in a fading environment when using multi-element antennas," Bell Labs Technical Journal, Autumn 1996.
NPL 3: S. ten Brink, G. Kramer and A. Ashikhmin, "Design of Low-Density Parity-Check Codes for Modulation and Detection," IEEE Transactions on Communications, Vol. 52, No. 4, pp. 670-678, April 2004.
NPL 4: T. Yano and T. Matsumoto, "Arithmetic Extended-Mapping for BICM-ID with Repetition Codes", Proceedings 2009 International ITG Workshop on Smart Antennas (WSA 2009), pp. 304-311, February 2009.

SUMMARY OF INVENTION

Technical Problem

NPL 1 discloses that the related art disclosed in NPL 1 can achieve the maximum capacity of a multiple access channel (MAC) Capacity Region (capacity region of multiple access channel) which is a theoretical limit when error correction encoding is ideal.

The MAC Capacity Region indicates a rate (transmission speed) which can be achieved when a plurality of signals is concurrently transmitted. For example, when two signals are concurrently transmitted, the MAC Capacity Region is a pentagon-shaped region illustrated in graphs in FIGS. 15(A) to 15(C).

In the graphs in FIGS. 15(A) to 15(C), the horizontal axis indicates a transmission speed of a first signal, and the vertical axis indicates a transmission speed of a second signal.

By the combination of rates of points in the region outside the pentagon, theoretically, the transmission cannot be performed. Therefore, points on the oblique side of the pentagon provide a theoretical maximum rate.

Each circle in FIGS. 15(A) to 15(C) indicates a combination of rates which can be achieved by SIC.

That is, when the first signal is demodulated, communication with a rate a can be performed while receiving interference from the second signal.

Here, when the demodulation and decoding of the first signal have been completed and the reception signal replica of the first signal is generated and that is canceled from the reception signal, the second signal and noise are remained. Here, when the second signal is demodulated, communication with a rate b can be performed without receiving the interference from the first signal.

Therefore, when quality of the propagation path of the first signal is equal to that of the second signal, this satisfies b>a. The second signal can perform communication with a faster rate than the first signal.

Conversely, when the demodulation and cancellation of the second signal are performed first, the combination of the rates at the point on the lower right of the oblique side of the pentagon can be achieved. In this case, a<b is satisfied.

As described above, in the technique disclosed in NPL 1, there is a problem in that the rates to be achieved are unequal to each other.

Under a condition in which the correlation between the propagation paths of the first and second signals is small and the MIMO is easily separated, a difference between a and b is small as illustrated in FIG. 15(A). On the other hand, under a condition in which the correlation is large and the MIMO is not easily separated, there is a possibility that the rate at which the previously demodulated first signal can be transmitted is extremely small as illustrated in FIG. 15(C).

In this case, when the rate a at which the first signal can be transmitted falls below the transmission speed of the first signal, the demodulation and decoding of the first signal are failed, and it cannot be correctly canceled from the reception signal.

As a result, when the second signal is demodulated, the demodulation is performed without canceling the first signal. Then, the demodulation of the second signal is also failed.

In a technique disclosed in NPL 2, when the first signal is transmitted, the transmission speeds are averaged by sequentially switching transmission antennae. A problem such that the transmission speeds of channels are unequal to each other is solved.

However, when the first and second signals are transmitted from different wireless communication apparatuses, the antennae cannot be switched to each other. Therefore, the technique disclosed in NPL 2 cannot be employed.

Solution to Problem

To solve the above-mentioned problems, in the present invention, frame timing of a first transmission signal is set to be different from that of the second transmission signal on the transmission side.

An exemplary timing of the transmission signal is illustrated in FIG. 3.

As it is obvious from FIG. 3, the frame of the second transmission signal (second frame) is transmitted at timings overlapped with those of two frames of the first transmission signal (first and third frames).

The frame here indicates a signal structure for storing a codeword unit of error correction encoding and may include a reference signal for synchronization and propagation path estimation and other control signals.

On a reception side, first, the first frame of the first transmission signal is demodulated and decoded by using the reception signal (first reception signal).

Next, a reception signal replica of the first frame is generated based on the decoding result, and a second reception signal is generated in which the replica signal of the first frame has been canceled from the first reception signal.

In the second reception signal, the interference from the first frame is canceled in the second frame. However, the interference from the third frame is remained. When the second frame is demodulated in this state, there is no interference in the period which is overlapped with the first frame. Therefore, a comparatively large mutual information amount can be obtained from the demodulation signal. Since the interference exists in the period overlapped with the third frame, a comparatively small mutual information amount can be obtained.

The demodulation signal obtained by demodulating the second frame is input to an error correction decoder, and data transmitted based on both of the comparatively large information amount and comparatively small information amount is decoded. The operations above are illustrated in FIG. 5.

According to the present invention, regarding the second transmission signal, any points on the oblique side of the pentagon of the MAC Capacity Region can be realized. For example, when almost all the period of the second frame is superposed with the first frame and almost no period is superposed with the third frame, interference received from the first transmission signal is almost eliminated. Therefore, the rate is close to a point on the upper left of the oblique side of the pentagon of the MAC Capacity Region.

Also, on the other hand, when almost all the period of the second frame is superposed with the third frame and almost no period is superposed with the first frame, the demodulation is performed in almost all the period while the interference from the first transmission signal is received. Therefore, the rate is close to a point on the lower right of the oblique side of the pentagon of the MAC Capacity Region. Also, the frames of the first and second transmission signals are shifted to each other by half frame, the rate at the center of the oblique side of the pentagon is achieved.

Advantageous Effects of Invention

According to the present invention, in a capacity region of a multiple access channel (MAC Capacity Region) which is a theoretical limit, a combination of transmission speeds that is equal between the channels and is the maximum can be realized.

DESCRIPTION OF EMBODIMENTS

Embodiments of the present invention will be described below with reference to the drawings.

First Embodiment

Figure 1:
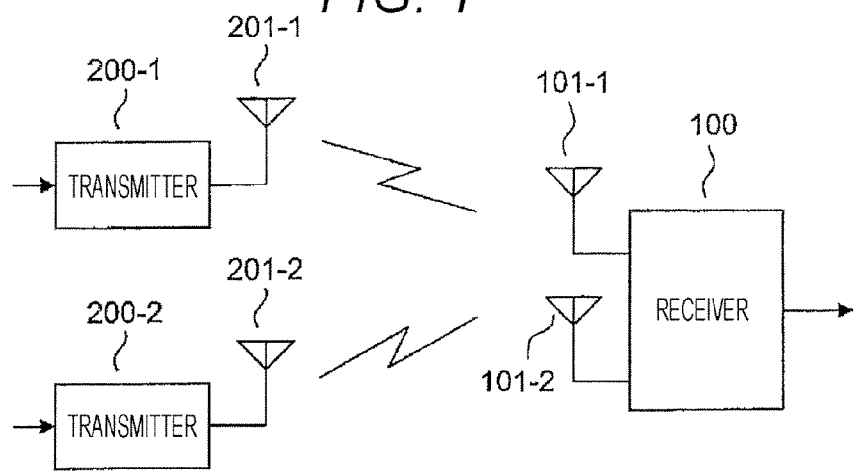
FIG. 1 is a diagram of an exemplary system structure according to the first embodiment.

A system structure according to a first embodiment is illustrated in FIG. 1. Two transmission-side wireless communication apparatuses 200-1 and 200-2 transmit signals respectively from antennae 201-1 and 201-2. The transmitted signals are respectively received by antennae 101-1 and 101-2 in a reception-side wireless communication apparatus 100.

Figure 2:
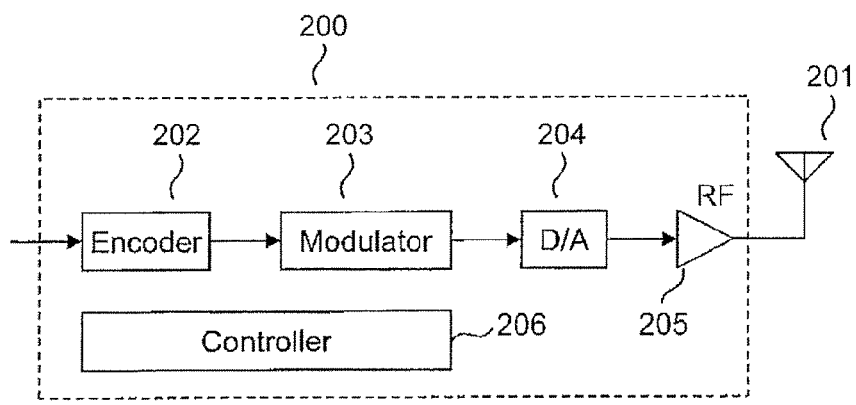
FIG. 2 is a diagram of an exemplary structure of a transmission-side wireless communication apparatus according to the first embodiment.

For example, the transmission-side wireless communication apparatuses 200-1 and 200-1 are configured as illustrated in FIG. 2.

An encoder 202 performs error correction encoding to transmission data, and a codeword is output.

The output codeword is modulated by a modulator 203 and converted to an analog signal by a D/A converter 204. The codeword is output from the antenna 201 via a radio frequency circuit 205.

The structures of the transmission-side wireless communication apparatuses 200-1 and 200-2 may be the same as illustrated in FIG. 2. However, a controller 206 controls each communication apparatus so that operation timings of the respective communication apparatuses are different from each other.

Figure 3:
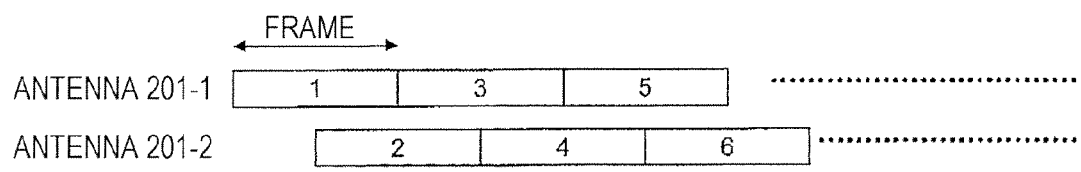
FIG. 3 is a diagram of an exemplary frame timing according to the first embodiment.

Specifically, for example, as illustrated in FIG. 3, frame timing when the antenna 201-1 of the transmission-side wireless communication apparatus 200-1 transmits a frame is different from frame timing when the antenna 201-2 of the transmission-side wireless communication apparatus 200-2 transmits the frame (timing shifted by half of frame time from each other in FIG. 3).

Here, a frame indicates a signal structure for storing a codeword unit of the error correction encoding. The frame may include a reference signal for synchronization and propagation path estimation and other control signals. A unit for controlling the timing is not especially shown. The two transmission-side wireless communication apparatuses 200-1 and 200-2 may perform time synchronization according to the reference signal transmitted from the reception-side wireless communication apparatus 100. Also, it is preferable to determine the frame timings after the time synchronization is performed by using a general synchronization method, for example, to perform the time synchronization by using absolute time information obtained from a global positioning system (GPS) and the like. As another method, a method may be used for measuring the timings of the signals from the transmission-side wireless communication apparatuses 200-1 and 200-2 by the reception-side wireless communication apparatus 100 and transmitting the control signal which controls individual timings so that mutual timing relation becomes predetermined timing.

Figure 4:
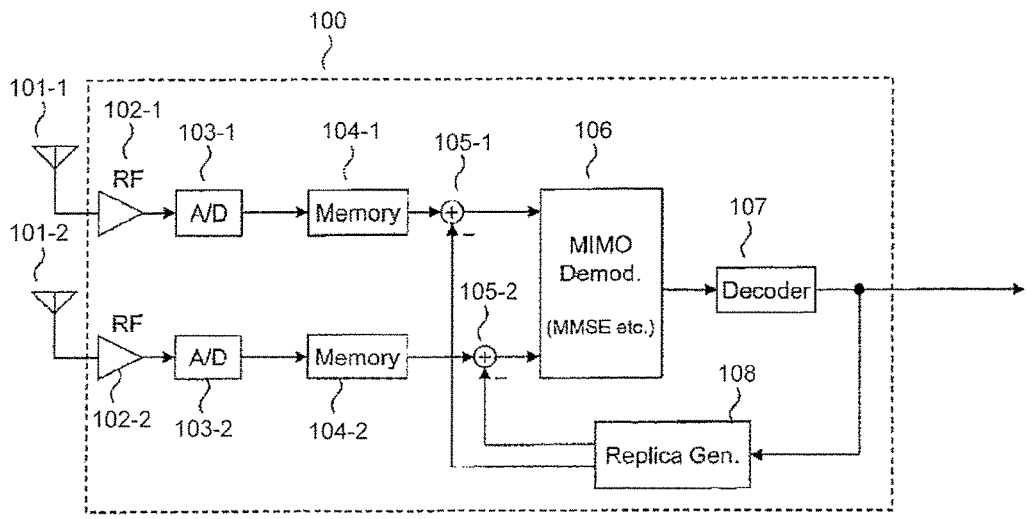
FIG. 4 is a diagram of an exemplary structure of a reception-side wireless communication apparatus according to the first embodiment.

For example, the reception-side wireless communication apparatus 100 is configured as illustrated in FIG. 4. The signals received by the antennae 101-1 and 101-2 are respectively stored in memories 104-1 and 104-2 via radio frequency circuits 102-1 and 102-2 and A/D converters 103-1 and 103-2.

The signals stored in the memories 104-1 and 104-2 are read at predetermined timing and demodulated by a MIMO demodulator 106. The demodulated signal is decoded by an error correction decoder 107, and reception data is output.

The decoded reception data is encoded and modulated by a replica generator 108 again, and a reception signal replica for one frame corresponding to the decoded reception data is generated. The generated reception signal replica is subtracted from the reception signal read from the memories 104-1 and 104-2 at the time of next demodulation and is input to the MIMO demodulator 106.

Figure 5:
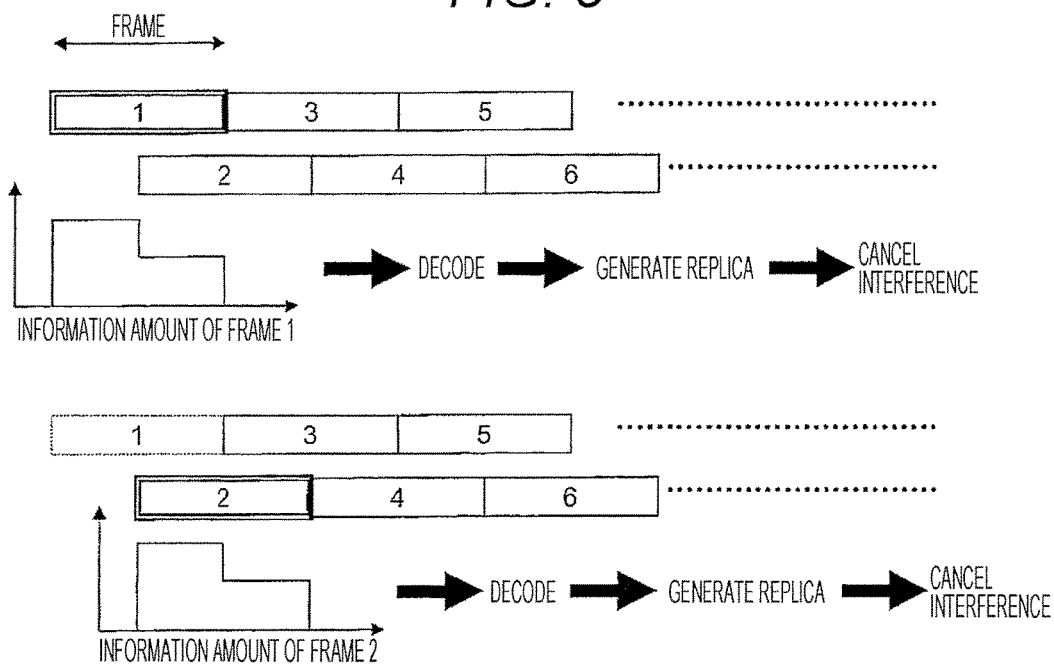
FIG. 5 is a diagram of an exemplary operation of the reception-side wireless communication apparatus according to the first embodiment.

An operation principle of the reception-side wireless communication apparatus 100 is illustrated in FIG. 5. First, the reception-side wireless communication apparatus 100 demodulates and decodes a first frame transmitted from the transmission-side wireless communication apparatus 200-1.

At this time, since the transmission-side wireless communication apparatus 200-2 has not transmitted the signal yet in the first half of the first frame, there is no interference.

On the other hand, since a second frame is transmitted from the transmission-side wireless communication apparatus 200-2 in the latter half of the first frame, the interference exists.

Therefore, a mutual information amount obtained from the result of demodulation of the first frame is large in the first half and small in the latter half.

The error correction decoder 107 decodes the demodulated signal by using both the large mutual information amount in the first half and the small mutual information amount in the latter half. When the decoding result of the first frame is obtained, a reception signal replica corresponding to the frame is generated by the replica generator 108 and is canceled from the reception signal.

Next, the reception-side wireless communication apparatus 100 demodulates and decodes the second frame transmitted from the transmission-side wireless communication apparatus 200-2. At this time, since the signal of the first frame which has been superposed and transmitted is canceled in the first half of the second frame, there is no interference.

On the other hand, since a third frame transmitted from the transmission-side wireless communication apparatus 200-1 is superposed in the latter half of the second frame, the interference exists.

Therefore, a mutual information amount obtained from the result of demodulation of the second frame is also large in the first half and small in the latter half.

Subsequently, the similar processing is performed to the third frame transmitted from the transmission-side wireless communication apparatus 200-1 and a fourth frame transmitted from the transmission-side wireless communication apparatus 200-2.

Figure 6:
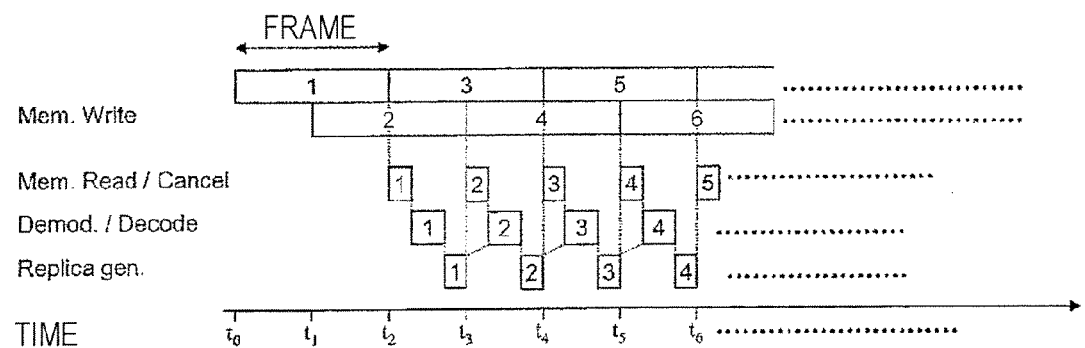
FIG. 6 is a diagram of an exemplary operation timing of the reception-side wireless communication apparatus according to the first embodiment.

An exemplary operation timing of the reception-side wireless communication apparatus 100 is illustrated in FIG. 6.

The first frame from the transmission-side wireless communication apparatus 200-1 is received in a period between times t0 and t2, and the second frame from the transmission-side wireless communication apparatus 200-2 is received in a period between times t1 and t3. The third frame from the transmission-side wireless communication apparatus 200-1 is received in a period between times t2 and t4.

Subsequently, the fourth to sixth frames are similarly illustrated.

The respective frames are stored in the memories 104-1 and 104-2 concurrently with the reception.

When the first frame has been stored in the memory, the first frame is read from the memory and demodulated (Demod.) and decoded (Decode). Continuously, a replica is generated (Replica gen.).

When the replica of the first frame has been generated and the second frame has been stored in the memories 104-1 and 104-2, the second frame is read from the memory. The interference from the first frame is canceled (Cancel) and, the second frame is demodulated (Demod.) and decoded (Decode). Continuously, a replica is generated (Replica gen.).

Subsequently, operations relative to the third frame and frames after that are similarly performed. However, in order to smoothly perform the operations, it is necessary to complete to cancel the interference for two frames, to demodulate and decode two frames, and generate replicas of two frames within a time corresponding to one frame. Since the number of multiple accesses is two in the present embodiment, processing for two frames is performed within time corresponding to one frame. However, when the number of multiple accesses is N, it is necessary to perform processing for N frames within time corresponding to one frame.

Next, an operation of the MIMO demodulator 106 is described. Generally, a relation indicated in (Mathematical Formula 1) is satisfied regarding a transmission signal vector s, a reception signal vector r, and a propagation path matrix H.

$$r = Hs \qquad \text{[Mathematical Formula 1]}$$

When the numbers of transmission antennae and reception antennae illustrated in FIG. 1 are two, the transmission signal vector s can be expressed as (Mathematical Formula 2). The reception signal vector r can be expressed as (Mathematical Formula 3), and the propagation path matrix can be expressed as (Mathematical Formula 4). Therefore, (Mathematical Formula 1) can be expressed as (Mathematical Formula 5).

$$s = \begin{pmatrix} s_1 \\ s_2 \end{pmatrix} \qquad \text{[Mathematical Formula 2]}$$

$$r = \begin{pmatrix} r_1 \\ r_2 \end{pmatrix} \qquad \text{[Mathematical Formula 3]}$$

$$H = \begin{pmatrix} h_{11} & h_{12} \\ h_{21} & h_{22} \end{pmatrix} \qquad \text{[Mathematical Formula 4]}$$

$$\begin{pmatrix} r_1 \\ r_2 \end{pmatrix} = \begin{pmatrix} h_{11} & h_{12} \\ h_{21} & h_{22} \end{pmatrix} \begin{pmatrix} s_1 \\ s_2 \end{pmatrix} \qquad \text{[Mathematical Formula 5]}$$

The reception vector in (Mathematical Formula 1) is actually received while noise is added to the vector. Therefore, minimum mean square error (MMSE) demodulation method is often used which minimizes a total power of the noise and the interference between the transmission signals.

When it is assumed that the demodulation result of the MMSE demodulation be $\hat{s}$, the MMSE demodulation can be expressed as (Mathematical Formula 6).

$$\hat{s} = H^H \left( HH^H + \frac{\sigma^2}{P_T} I \right)^{-1} \cdot r \qquad \text{[Mathematical Formula 6]}$$

In (Mathematical Formula 6), $\sigma$ is a standard deviation of the noise included in the reception signal r, and $P_T$ is transmission power, and I is a unit matrix. Also, $H^H$ expresses Hermitian transpose (complex conjugate transposition) of the matrix H.

Here, when the propagation path matrix H indicates the propagation paths from the transmission antennae to the reception antennae, the transmission power $P_T$ is transmission powers at the end of the transmission antennae. However, more practically, the demodulator uses a propagation path matrix from the output of the modulator 203 of the transmission-side wireless communication apparatus 200 to the input of the MIMO demodulator 106 of the reception-side wireless communication apparatus 100 as the propagation path matrix H in many cases. Therefore, it is preferable that the transmission power $P_T$ be a signal power at the output end of the modulator 203.

Figure 7:
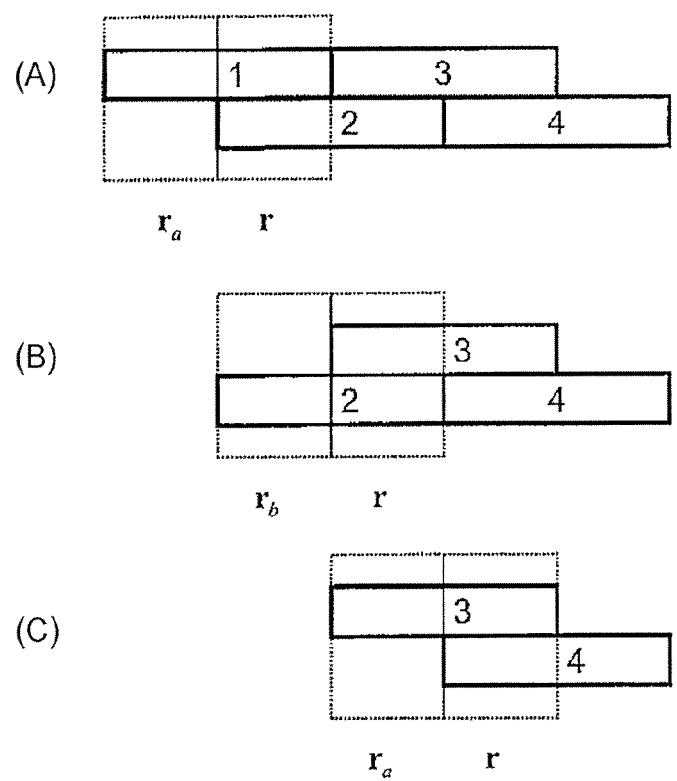
FIGS. 7(A) to 7(C) are diagrams of an operation of a MIMO demodulator according to the first embodiment.

It is now considered that the reception signal according to the present invention illustrated in FIG. 5 is demodulated. First, as illustrated in FIG. 7(A), the first frame can be divided in to a period of a reception signal $r_a$ in the first half with no interference from the transmission-side wireless communication apparatus 200-2 and a period of a reception signal r in the latter half with the interference from the transmission-side wireless communication apparatus 200-2.

The reception signal $r_a$ with no interference from the transmission-side wireless communication apparatus 200-2 in the first half can be expressed as (Mathematical Formula 9) by using a matrix $H_a$ illustrated in (Mathematical Formula 8).

$$\hat{s} = \begin{pmatrix} \hat{s}_1 \\ \hat{s}_2 \end{pmatrix} \qquad \text{[Mathematical Formula 7]}$$

$$H_a = \begin{pmatrix} h_{11} & 0 \\ h_{21} & 0 \end{pmatrix} \qquad \text{[Mathematical Formula 8]}$$

$$r_a = H_a s \qquad \text{[Mathematical Formula 9]}$$

In the matrix $H_a$, a second row of the original propagation path matrix H is set to be zero, and the reception signal $r_a$ does not include a transmission signal $s_2$. Therefore, the reception signal $r_a$ with no interference from the transmission-side wireless communication apparatus 200-2 in the first half may be demodulated by using (Mathematical Formula 6) in which r and H are respectively replaced with $r_a$ and $H_a$.

On the other hand, the period of the reception signal r with the interference from the transmission-side wireless communication apparatus 200-2 in the latter half may be demodulated by using (Mathematical Formula 6) by using H in (Mathematical Formula 4) as H. Regarding a demodulation signal $\hat{s}$ obtained by using (Mathematical Formula 6) both in the first half and the latter half, it is preferable to calculate a part ($\hat{s}_1$ in (Mathematical Formula 7)) corresponding to the first frame. It is not necessary to calculate a value $\hat{s}_2$ in (Mathematical Formula 7).

Next, when the demodulation and decoding of the first frame and the generation and cancellation of the replica have been completed, the second frame is divided into a period of a reception signal $r_b$ with no interference from the transmission-side wireless communication apparatus 200-1 in the first half and a period of a reception signal r with the interference from the transmission-side wireless communication apparatus 200-1 in the latter half as illustrated in FIG. 7(B). The reception signal $r_b$ with no interference from the transmission-side wireless communication apparatus 200-1 in the first half can be expressed as (Mathematical Formula 11) by using a value $H_b$ in (Mathematical Formula 10).

$$H_b = \begin{pmatrix} 0 & h_{12} \\ 0 & h_{22} \end{pmatrix}$$ [Mathematical Formula 10]

$$r_b = H_b s$$ [Mathematical Formula 11]

In the matrix $H_b$, a first row of the original propagation path matrix H is set to be zero, and the reception signal $r_b$ does not include the transmission signal $s_1$. Therefore, the reception signal $r_b$ with no interference from the transmission-side wireless communication apparatus 200-1 in the first half may be demodulated by using (Mathematical Formula 6) in which r and H are respectively replaced with $r_b$ and $H_b$. On the other hand, the period of the reception signal r with the interference from the transmission-side wireless communication apparatus 200-1 in the latter half may be demodulated by using (Mathematical Formula 6) by using H in (Mathematical Formula 4) as H.

Regarding the demodulation signal $s\hat{}$ obtained by using (Mathematical Formula 6) both in the first half and the latter half, it is preferable to calculate a part ($s_2\hat{}$ in (Mathematical Formula 7)) corresponding to the second frame. It is not necessary to calculate a value $s_1\hat{}$ in (Mathematical Formula 7).

Similarly, when the demodulation and decoding of the second frame and the generation and the cancellation of the replica have been completed, the third frame is divided into a period of the reception signal $r_a$ with no interference from the transmission-side wireless communication apparatus 200-2 in the first half and a period of the reception signal r with the interference from the transmission-side wireless communication apparatus 200-2 in the latter half as illustrated in FIG. 7(C). Therefore, the demodulation method for the third frame is similar to that of the first frame. Similarly, the fourth frame and frames after that are divided into the first half in which the frame has no interference and the latter half in which the frame has the interference, and the MMSE demodulation can be performed to the frames.

The method for performing demodulation by using the MMSE method has been described above. However, other demodulation methods such as a maximum likelihood detection (MLD) method disclosed in NPL 1 can be applied.

Also, in a case where the other demodulation methods are applied, it is preferable that the demodulation be performed by using the propagation path matrix $H_a$ in (Mathematical Formula 8) or the propagation path matrix $H_b$ in (Mathematical Formula 10) with no interference term when the first half of the frame is demodulated and by using the propagation path matrix H with the interference term when the latter half of the frame is demodulated.

Also, as a demodulation result, it is preferable to output in a form of a log likelihood ratio (LLR) so that the following error correction decoder 107 can easily use the demodulation result.

Figure 8:
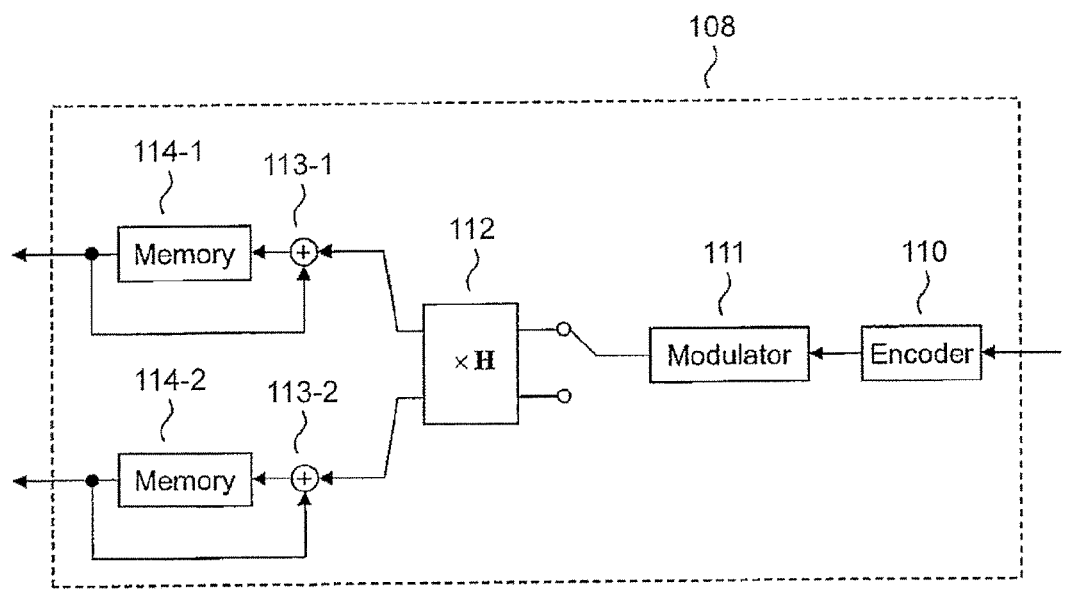
FIG. 8 is a diagram of an exemplary structure of a replica generator according to the first embodiment.

For example, the replica generator 108 of the reception-side wireless communication apparatus 100 can be configured as illustrated in FIG. 8.

That is, an encoder 110 encodes the decoded reception data for one frame in the same way as those of the encoders 202 of the transmission-side wireless communication apparatuses 200-1 and 200-2.

Next, the modulator 111 modulates the above reception data in the same way as those of the modulators 203 of the transmission-side wireless communication apparatuses 200-1 and 200-2. Regarding the modulation result by the modulator 111, a reception signal replica for one frame is generated by multiplying the propagation path matrix H indicated in (Mathematical Formula 4) above by a propagation path simulator 112.

At this time, when the replica of the frame transmitted from the transmission-side wireless communication apparatus 200-1 is generated, a switch of an input unit of the replica generator 108 is switched to the upper side, and zero is input to the lower side. On the other hand, when the replica of the frame transmitted from the transmission-side wireless communication apparatus 200-2 is generated, the switch of the input unit of the replica generator 108 is switched to the lower side, and zero is input to the upper side.

According to this, in elements in the propagation path matrix H, elements between the transmission-side wireless communication apparatus (200-1 or 200-2) that has transmitted the frame of which the replica should be generated and the reception-side wireless communication apparatus 100 are used.

In any case, the replica generator 108 generates and outputs both of the replicas of the signals received by the antennae 101-1 and 101-2. The outputs are respectively stored in the memories 114-1 and 114-2. Since the number of the multiple accesses is two in the present embodiment, it is preferable to generate the replica of the signal from the single transmission-side wireless communication apparatus for transmitting the signal to be the interference relative to the signal to be demodulated. However, when the number of the multiple accesses is N, it is necessary to generate the replica by adding all the signals from N−1 transmission-side wireless communication apparatuses for transmitting the signal to be the interference. In this case, the input of the propagation path simulator 112 becomes N, and the input is performed by sequentially switching the signals from the modulator 111. Also, as illustrated in FIG. 8, it is preferable that adders 113-1 and 113-2 be arranged and a new signal replica be accumulated to the replicas which have been generated and stored in the memories memory 114-1 and 114-2. Also, in the description on the embodiment, since the number of reception antennae is two, the replicas for two antennae are generated. However, when the number of reception antennae is different, it is preferable that the number of outputs of the propagation path simulator 112 and the numbers of memories (114-1 and 114-2) and adders (113-1 and 113-2) be the number of reception antennae.

The replica generator 108 described above accumulates and stores the replica signals which have been generated in the past. However, the replica generator 108 may sequentially subtract the generated replica signals from the memories 104-1 and 104-2 and store them in the memories 104-1 and 104-2 again.

In any case, it is preferable that the memories 104-1, 104-2, 114-1, and 114-2 store the signal corresponding to time used to demodulate the frame after that. Time that has been already used for the demodulation and is not necessary any more may be discarded.

It is necessary for the reception-side wireless communication apparatus 100 to know the propagation path matrix H in the first embodiment. A method is not especially shown. However, to achieve the above condition, it is preferable to use a method which is generally used in the wireless communication. In the method, known reference signals are regularly transmitted from the transmission-side wireless communication apparatuses 200-1 and 200-2 and the propagation path matrix H is estimated based on the received result.

Also, as the error correction encoding method used by the error correction encoder 202 in the first embodiment, a very general method can be used. For example, the very general method is to perform interleave after performing convolutional encoding. Also, it is preferable to employ a code with excellent characteristics, such as a code decoded by using repetitive demodulation and decoding (bit interleaved coded modulation—iterative decoding (BICM-ID)) disclosed in NPLs 3 and 4.

The structure and operation of the first embodiment have been described above.

Figure 16:
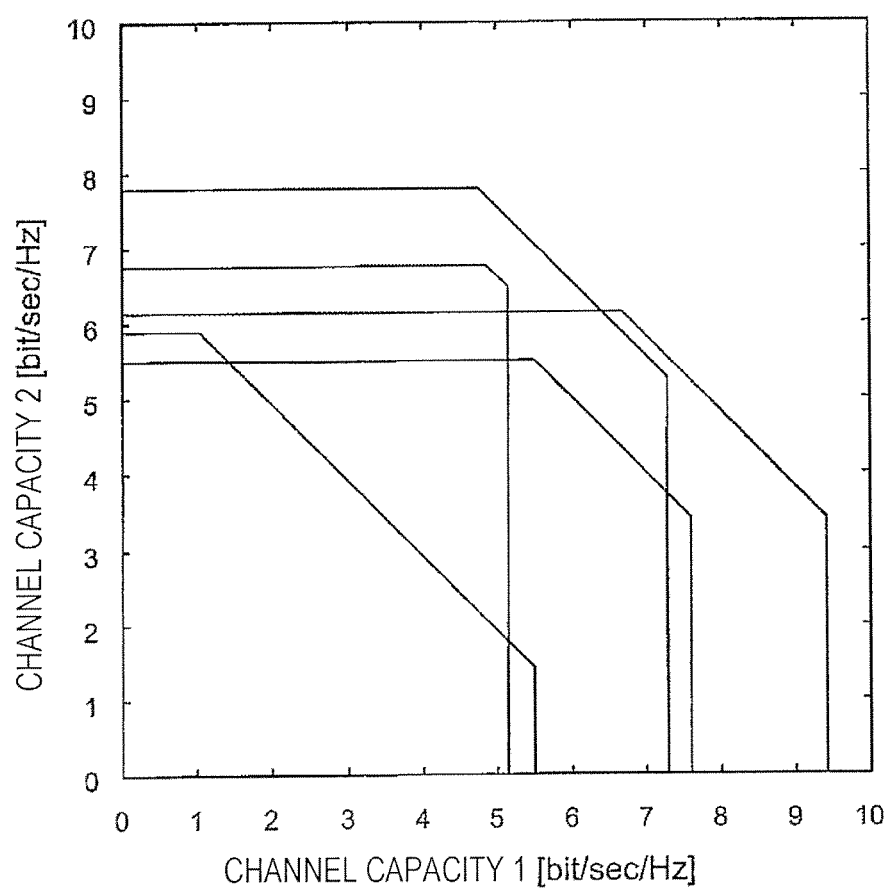
FIG. 16 is a diagram of exemplary MAC Capacity Regions.

According to the first embodiment, for example, when the error correction encoding is ideal for five propagation paths to be the MAC Capacity Region as illustrated in FIG. 16, channel capacities (transmission rate) can be realized. Each channel capacity is a point at the center of an oblique side of a pentagon of the MAC Capacity Region as indicated by each double circle illustrated FIG. 18.

Figure 17:
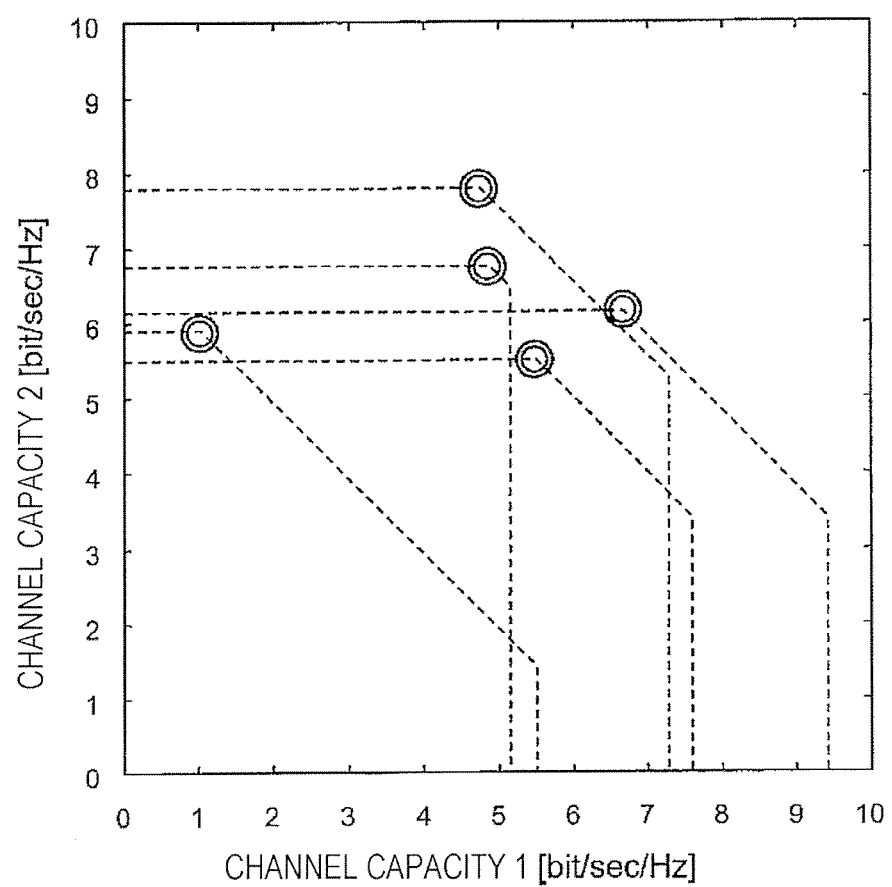
FIG. 17 is a diagram of a relation between channel capacities of the MAC Capacity Region and the related art.

In the related art disclosed in NPL 1, the channel capacities (transmission rate) indicated by double circles illustrated in FIG. 17 can be realized as described above. Therefore, a theoretical total capacity (transmission rate) of a channel 1 (a channel from the transmission-side wireless communication apparatus 200-1 to the reception-side wireless communication apparatus 100) and a channel 2 (a channel from the transmission-side wireless communication apparatus 200-2 to the reception-side wireless communication apparatus 100) is not changed.

Figure 18:
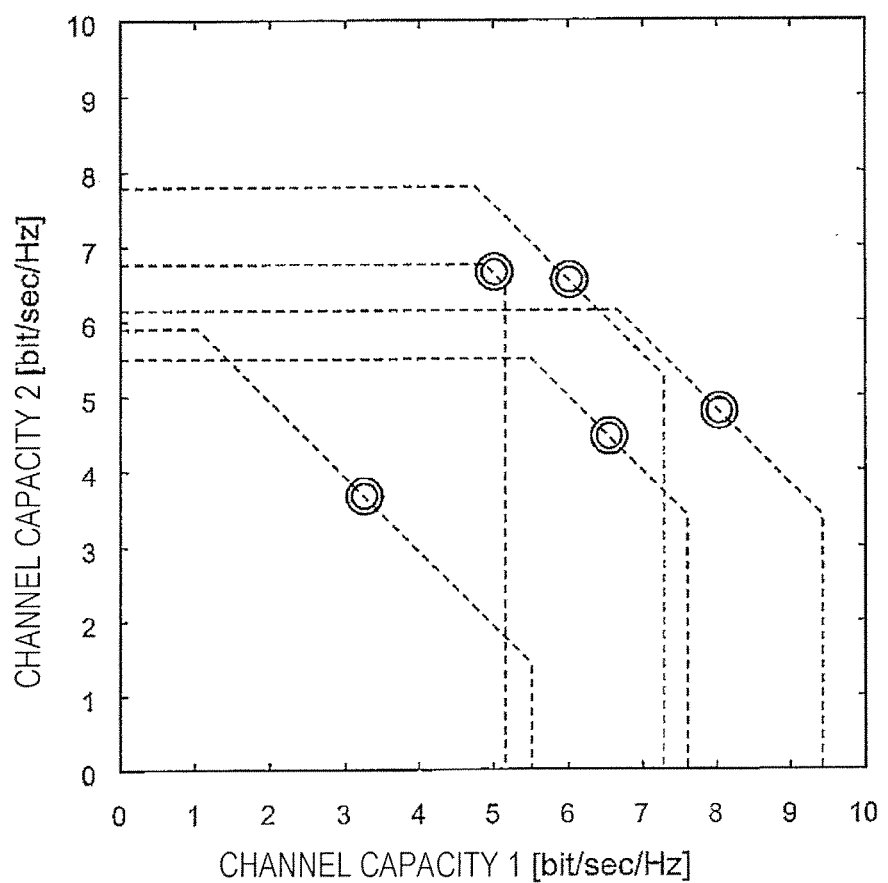
FIG. 18 is a diagram of a relation between channel capacities of the MAC Capacity Region and the first embodiment.

However, according to the present invention, even when the correlation between the propagation paths is larger as illustrated in FIG. 18, a problem that the capacity (transmission rate) of one channel is extremely small is solved.

Figure 20:
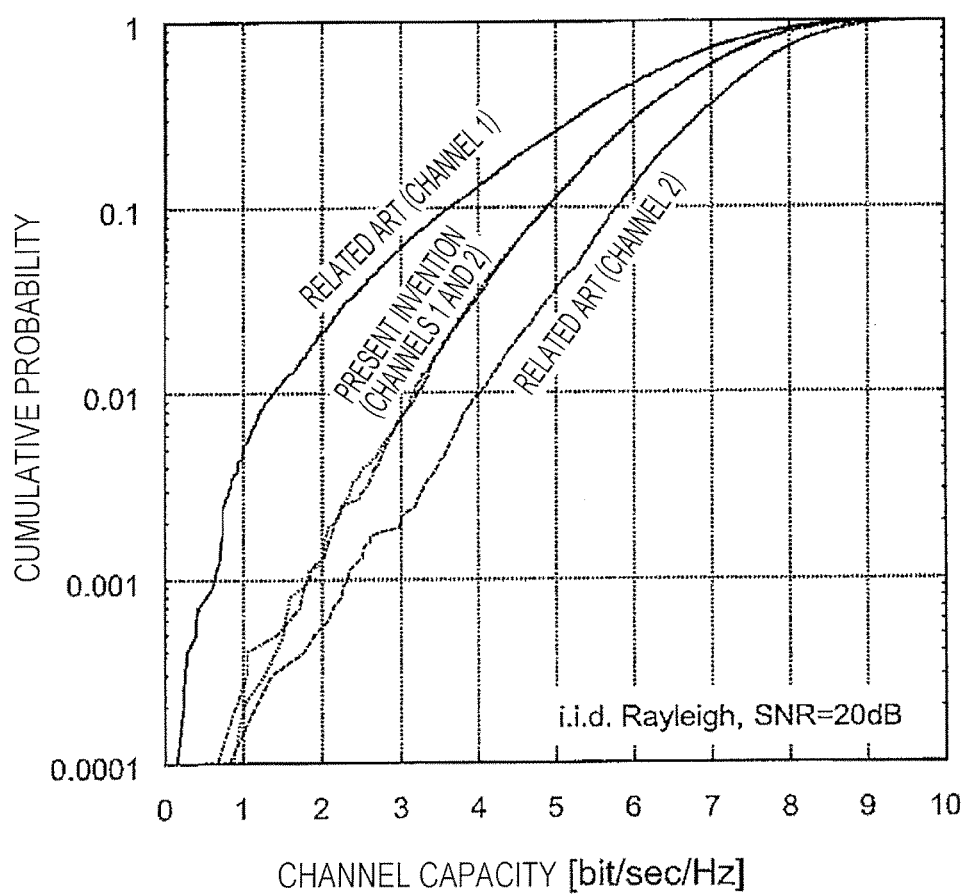
FIG. 20 is a diagram of a first example of a cumulative probability distribution of a channel capacity according to the first embodiment.
Figure 21:
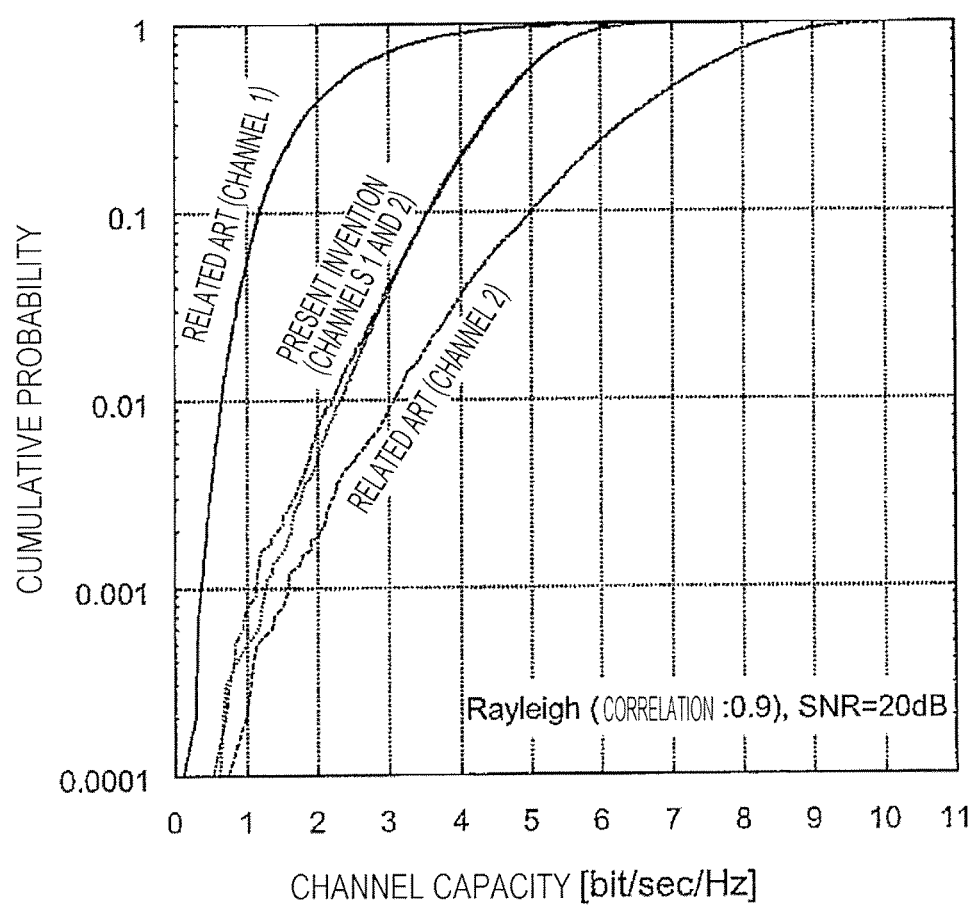
FIG. 21 is a diagram of a second example of the cumulative probability distribution of the channel capacity according to the first embodiment.

In FIGS. 20 and 21, the channel capacities (transmission rate) achieved by the related art and the channel capacity (transmission rate) achieved by the first embodiment of the present invention are compared with each other in a cumulative probability distribution.

A case where the propagation path follows the independent Rayleigh distribution is illustrated in FIG. 20, and a case where the propagation path follows the Rayleigh distribution having the correlation of 0.9 is illustrated in FIG. 21.

According to FIG. 20, in the related art, the channel 1 has the channel capacity (transmission rate) of 1.3 [bit/sec/Hz] at a 99% value (cumulative probability=0.01). Whereas, the channel 2 has the channel capacity (transmission rate) of 4.0 [bit/sec/Hz]. The channel 1 has the channel capacity which is about three times larger than that of the channel 2. On the other hand, in the present invention, the channels 1 and 2 secure the channel capacity (transmission rate) of 3.2 [bit/sec/Hz] at the 99% value (cumulative probability=0.01).

Also, according to FIG. 21 in which a case where the propagation path correlation is large (0.9) is illustrated, in the related art, the channel 1 has the channel capacity (transmission rate) of 0.6 [bit/sec/Hz] at the 99% value (cumulative probability=0.01). Whereas, the channel 2 has the channel capacity (transmission rate) of 3.1 [bit/sec/Hz]. The channel 1 has the channel capacity which is about five times larger than that of the channel 2.

On the other hand, in the present invention, the channels 1 and 2 secure the channel capacity (transmission rate) of 2.3 [bit/sec/Hz] at the 99% value (cumulative probability=0.01).

According to the present invention, it can be found that a combination of transmission speeds which are equal between the channels can be realized as described above. Also, according to FIGS. 20 and 21, for example, when the 99% value (cumulative probability=0.01) is considered, the total of the transmission speeds (rate) of the channels 1 and 2 in the present invention is larger than that of the related art.

This indicates that the present invention can effectively use the channel capacity, because the operation is performed with the transmission speed lower enough from the average of the channel capacities when the transmission speed (rate) equal to or more than a certain value is secured.

In the first embodiment above, as illustrated in FIG. 3, since the frame timings are shifted to each other for half frame time, the transmission speed of the channel 1 is equal to that of the channel 2. However, a balance between the transmission speeds of the channels 1 and 2 can be different by shifting the timings.

Second Embodiment

Figure 9:
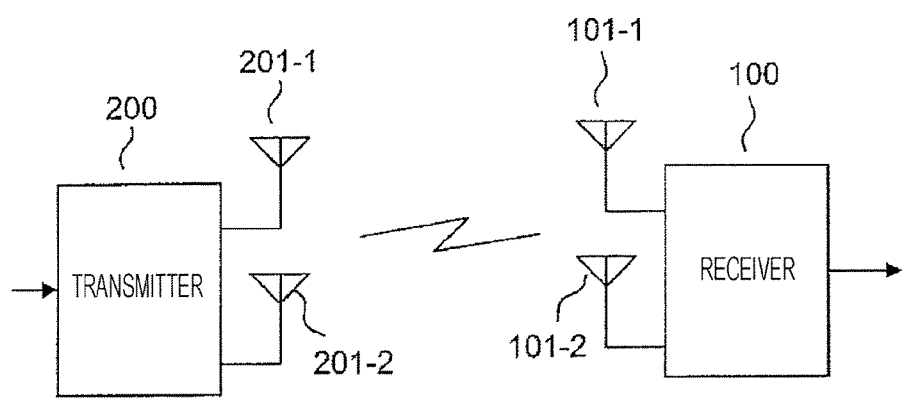
FIG. 9 is a diagram of an exemplary system structure according to a second embodiment.

Next, a system structure according to a second embodiment is illustrated in FIG. 9.

In the first embodiment, each of two individual transmission-side wireless communication apparatuses has a single transmission antenna. On the other hand, in the second embodiment, a single transmission-side wireless communication apparatus 200 has two transmission antennae (201-1 and 201-2).

Signals transmitted from the transmission antennae 201-1 and 201-2 are received by antennae 101-1 and 101-2 in a reception-side wireless communication apparatus 100.

Figure 10:
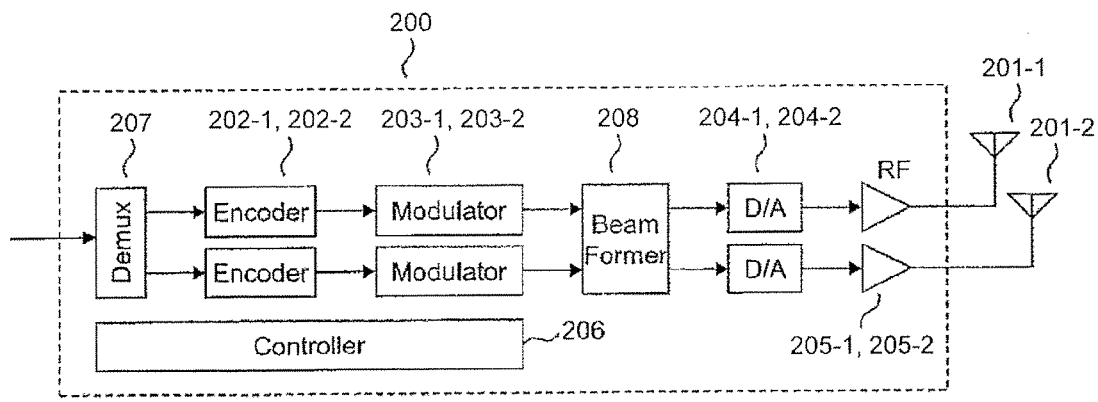
FIG. 10 is a diagram of an exemplary structure of a transmission-side wireless communication apparatus according to a third embodiment.

For example, a transmission-side wireless communication apparatus 200 is configured as illustrated in FIG. 10.

A distributor 207 distributes transmission data by frames, and the distributed data is input to encoders 202-1 and 202-2. The encoders 202-1 and 202-2 perform error correction encoding and output codewords.

The output codewords are respectively modulated by modulators 203-1 and 203-2. The modulated signals are respectively converted into analog signals by D/A converters 204-1 and 204-2 and are respectively output from the antennae 201-1 and 201-2 via radio frequency circuits 205-1 and 205-2.

A beamformer 208 may be arranged between the modulators 203-1 and 203-2 and the D/A converters 204-1 and 204-2. The beamformer 208 performs beam forming as necessary. The structures of the encoder 202-1, the modulator 203-1, and the like may be the same as those of the encoder 202-2, the modulator 203-2, and the like. However, a controller 206 controls these components to have different operation timings.

Specifically, for example, the frame timing transmitted from the antenna 201-1 is different from the frame timing transmitted from the antenna 201-2 as illustrated in FIG. 3.

When the frame timing in FIG. 3 is realized in the first embodiment, it is necessary to perform time synchronization between the transmission-side wireless communication apparatus 200-1 and the transmission-side wireless communication apparatus 200-2 with some means. However, in the second embodiment, since the single controller 206 controls the timings, it is not necessary to have a special synchronization unit.

Since a structure and operation of the reception-side wireless communication apparatus 100 according to the second embodiment are the same as those according to the first embodiment, the description is omitted.

Also, an effect is the same as that of the first embodiment as illustrated in FIGS. 18, 20, and 21.

Third Embodiment

Next, a third embodiment will be described.

A system structure according to the third embodiment is illustrated in FIG. 1 or FIG. 9.

Also, a structure of a transmission-side wireless communication apparatus is as illustrated in FIG. 2 or FIG. 10. Also, a structure of a reception-side wireless communication apparatus is as illustrated in FIG. 4. Operations except for an operation for controlling frame timings to be described are the same as those described above. Accordingly, the description is omitted.

As described above, in the first and second embodiments, a combination of channel capacities (transmission rate) of the point at the center of oblique side of pentagon of the MAC Capacity Region has been realized.

As a result, when it is statistically considered, both channel capacities are equal to each other as illustrated in FIGS. 20 and 21.

However, when it is instantaneously considered, the channel capacity of the channel 1 is different from that of the channel 2 as illustrated in FIG. 18.

Figure 11:
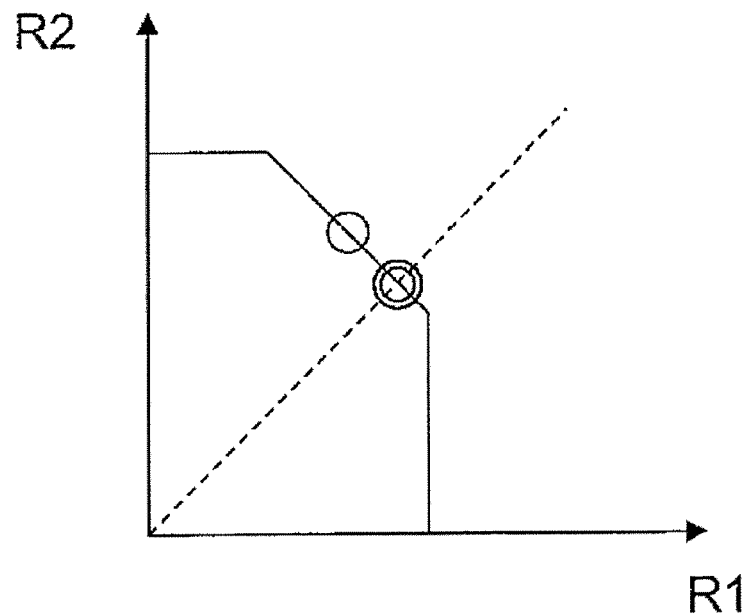
FIG. 11 is a diagram of control results according to the third embodiment.

In the third embodiment, as indicated by a double circle in FIG. 11, the control is performed to eliminate deviation of the channel capacity (transmission rate) due to an instantaneous variation of a propagation path.

As described above, when the frame timings are shifted from each other for half frame time, a channel capacity is the channel capacity (transmission rate) of a point at the center of the oblique side of the pentagon of the MAC Capacity Region as indicated by the circle in FIG. 11.

However, when deviation in the qualities of the propagation paths occurs as illustrated in FIG. 11, the capacity of the channel 1 is not the same as that of the channel 2.

In order to shift this to the point indicated by the double circle in FIG. 11, it is preferable to shift the frame timings. Specifically, the frame timings are controlled so that the frame timing of the channel 2 with high propagation path quality is relatively late and the frame timing of the channel 1 with low propagation path quality is relatively early.

Figure 12:
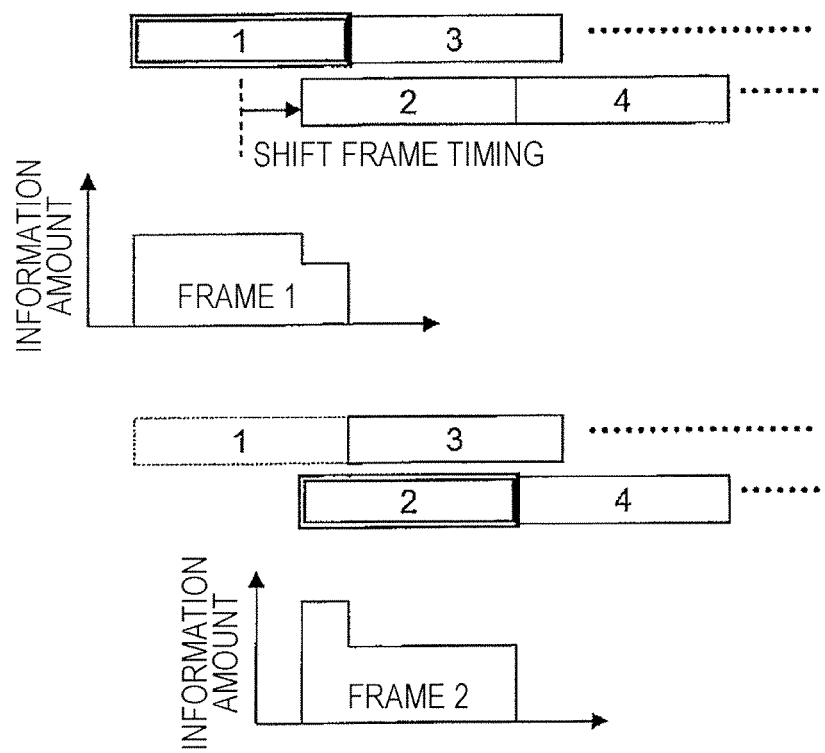
FIG. 12 is a diagram of an exemplary operation of a reception-side wireless communication apparatus according to the third embodiment.

This state is illustrated in FIG. 12. In FIG. 12, the timing of another frame which provides the interference is delayed so that a time rate when the channel 1 with low quality has the interference in the frame is reduced.

As a result, a time rate when the channel 1 has no the interference is increased, and an amount of information which can be received within time of one frame time is increased.

On the other hand, regarding the channel 2 with high quality, as a result of the control, the time rate when the channel 2 has the interference in the frame is increased, and the time rate when the channel 2 has no interference is reduced.

As a result, regarding the channel 2, an amount of the information which can be received within time of one frame is reduced. By controlling the frame timings in this way, a balance between the channel capacities of the channels 1 and 2 can be changed, and the channel capacities of the channels 1 and 2 can be controlled to be equal to each other.

Therefore, the reception-side wireless communication apparatus 100 transmits a control signal to the transmission-side wireless communication apparatus (200, 200-1, 200-2, and the like). It is preferable to perform the control so that a relative frame timing of the channel which has larger channel capacity is delayed.

Regarding the transmission-side wireless communication apparatus (200, 200-1, 200-2, and the like), the controller 206 advances/delays the frame timing according to the control signal from the reception-side wireless communication apparatus 100.

As a result of shifting the frame timing, in a case where the channel capacities are not equal to each other even when the frame timing reaches the upper left or lower right point of the oblique side of the pentagon of the MAC Capacity Region, more frame timing shift is meaningless. Therefore, it is preferable to set a range of the control so as not to control beyond the point.

Figure 19:
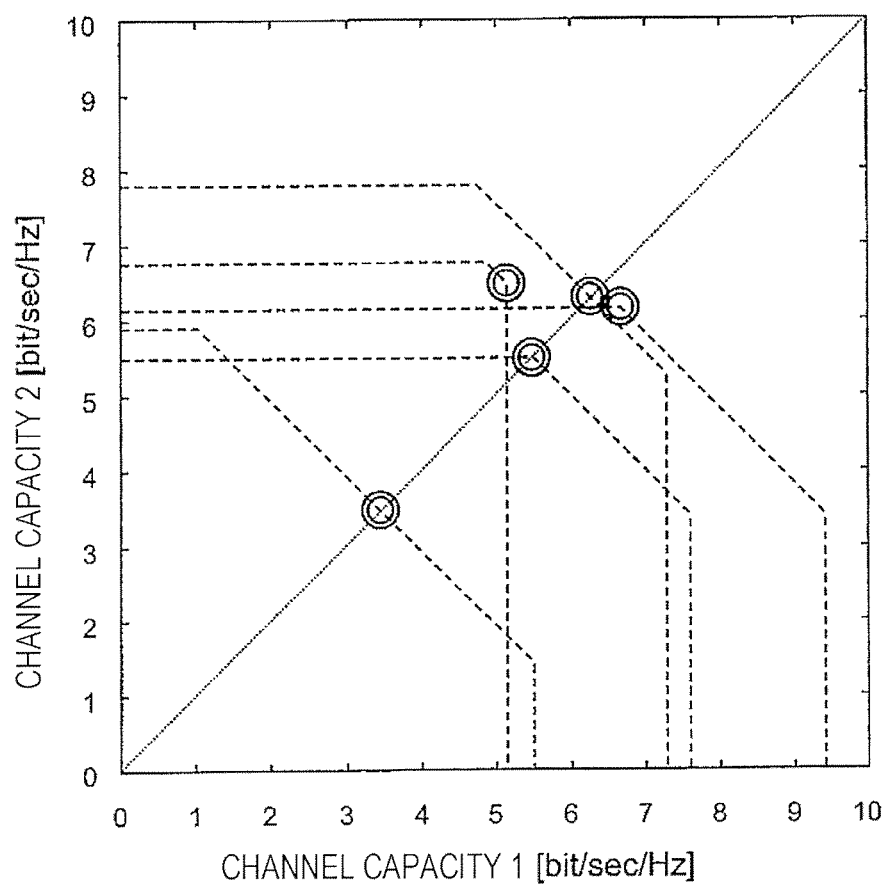
FIG. 19 is a diagram of a relation between channel capacities of the MAC Capacity Region and the third embodiment.

According to the third embodiment, for example, when the error correction encoding is ideal for five propagation paths to be the MAC Capacity Region as illustrated in FIG. 16, a combination of the points where the channel capacities (transmission rate) of the channels 1 and 2 are equal to each other as possible from among the points indicated by double circles at the points on the oblique sides of the pentagons of the MAC Capacity Region can be realized as illustrated in FIG. 19. As a result, the channel capacities (transmission speed) of the channels 1 and 2 are controlled to be instantaneously equal to each other as possible.

Figure 22:
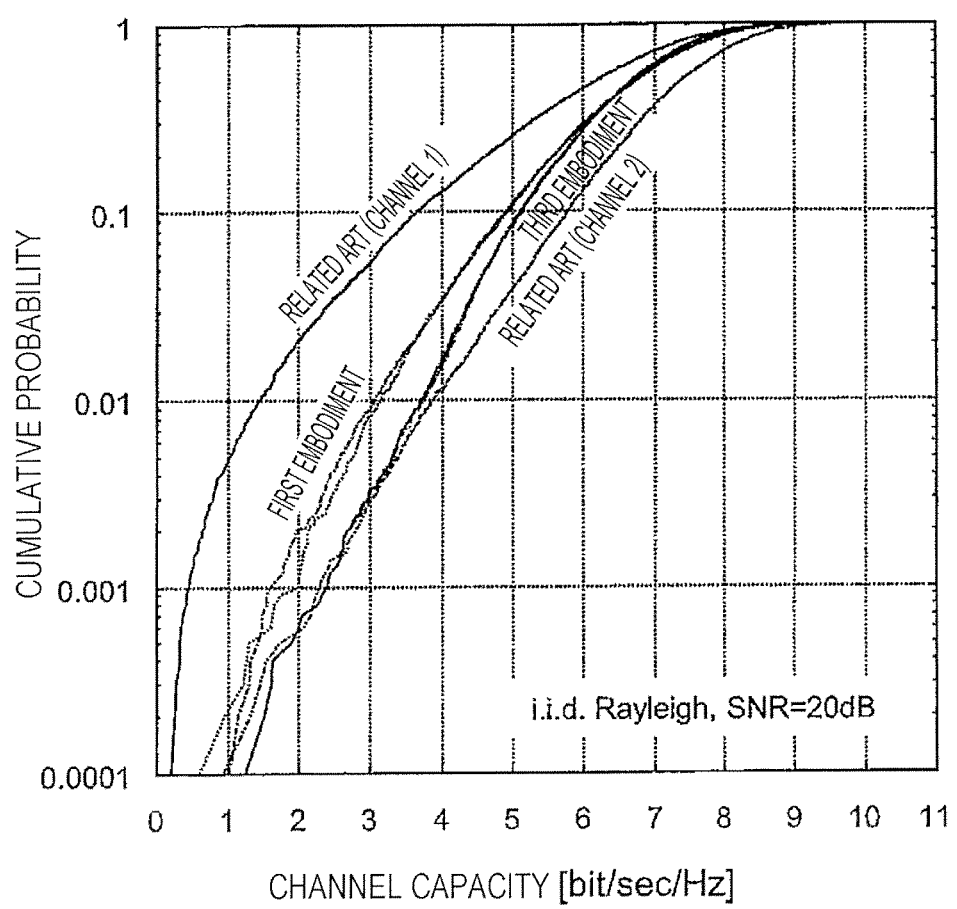
FIG. 22 is a diagram of a first example of a cumulative probability distribution of a channel capacity according to the third embodiment.
Figure 23:
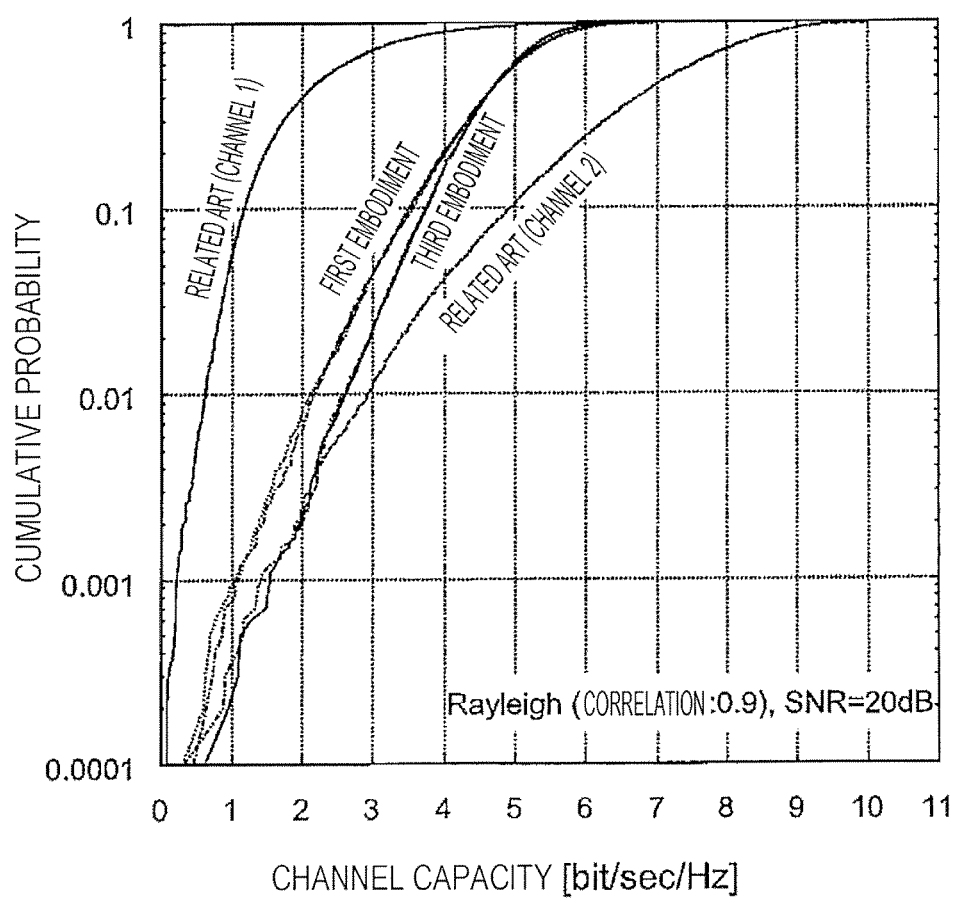
FIG. 23 is a diagram of a second example of the cumulative probability distribution of the channel capacity according to the third embodiment.

In FIGS. 22 and 23, the channel capacities (transmission rate) achieved by the related art, the channel capacity (transmission rate) achieved by the first embodiment of the present invention, and the channel capacity (transmission rate) achieved by the third embodiment of the present invention are compared with each other in a cumulative probability distribution. A case where the propagation path follows the independent Rayleigh distribution is illustrated in FIG. 22, and a case where the propagation path follows the Rayleigh distribution having the correlation of 0.9 is illustrated in FIG. 23. In any case, the third embodiment indicates that the channel capacity to be 99% value (cumulative probability=0.01) is improved as a result of mitigating instantaneous unevenness of the channel capacities. Also, in the third embodiment, the channel capacities can be more effectively used compared with the first embodiment.

In the third embodiment, the control to make the channel capacities be equal to each other has been described. However, more generally, it is effective to perform the control so that the channel capacity of each channel satisfies a predetermined condition (for example, to make the channel capacity be 1:2). Therefore, when the channel capacities of the respective channels are measured and the predetermined condition is not satisfied, it is preferable to control the frame timing to be close to the predetermined condition. Also, in this case, a point to control the frame timings as follows is similar to that of the third embodiment. The point is to control the frame timing so that a timing (for example, t0, t2, t4, and the like in FIG. 6) of the frame transmitted to the channel to increase its channel capacity is relatively advanced and a timing (for example, t1, t3, t5, and the like in FIG. 6) of the frame transmitted to the channel to decrease its channel capacity is relatively delayed. Also, when the channel quality is high, the channel capacity is large, and when the channel quality is low, the channel capacity is small. This is a general tendency. Therefore, the control can be performed by using other scale indicating channel quality such as signal quality instead of the channel capacity. As the channel quality, for example, an average value of a signal to interference/noise ratio (SINR) can be used. Also, other physical quantity which has causal relation with the channel capacity (transmission rate) can be used.

Fourth Embodiment

Next, a fourth embodiment will be described.

In the first to third embodiments, a case has been described in which two signals are concurrently transmitted and interfere with each other. However, in the fourth embodiment, a case will be described in which three signals are concurrently transmitted and interfere with each other.

The transmission signals are transmitted from two antennae 201-1 and 202-1 in a system structure in FIG. 1 or FIG. 9. However, the transmission signals are transmitted from three transmission antennae in the fourth embodiment.

The three transmission antennae may be included in the individual transmission-side wireless communication apparatuses as illustrated in FIG. 1. Also, the three transmission antennae may be included in a single transmission-side wireless communication apparatus as illustrated in FIG. 9. When the number of reception antennae is three or more, advantageous performance is obtained. However, when the number of the antennae is less than three, the present invention can be performed.

In the fourth embodiment, a case of two reception antennae is described as an example. In this case, when it is assumed that a transmission signal vector s be (Mathematical Formula 12), a propagation path H be (Mathematical Formula 13), and a reception signal r be (Mathematical Formula 3), (Mathematical Formula 1) can be expressed as (Mathematical Formula 14)

$$s = \begin{pmatrix} s_1 \\ s_2 \\ s_3 \end{pmatrix}$$ [Mathematical Formula 12]

$$H = \begin{pmatrix} h_{11} & h_{12} & h_{13} \\ h_{21} & h_{22} & h_{23} \end{pmatrix}$$ [Mathematical Formula 13]

$$\begin{pmatrix} r_1 \\ r_2 \end{pmatrix} = \begin{pmatrix} h_{11} & h_{12} & h_{13} \\ h_{21} & h_{22} & h_{23} \end{pmatrix} \begin{pmatrix} s_1 \\ s_2 \\ s_3 \end{pmatrix}$$ [Mathematical Formula 14]

For example, a transmission-side wireless communication apparatus can be configured as illustrated in FIG. 2 or FIG. 10. Also, a single transmission-side wireless communication apparatus may include three transmission antennae as described above. Also, a reception-side wireless communication apparatus includes two antennae and, for example, is configured as illustrated in FIG. 4. An operation of the transmission-side wireless communication apparatus has been already described in the other embodiments. However, as illustrated in FIGS. 13(A) to 13(D), the frame timings are arranged so as to be shifted to each other.

The reception-side wireless communication apparatus will be described with reference to FIGS. 13(A) to 13(D).

Figure 13:
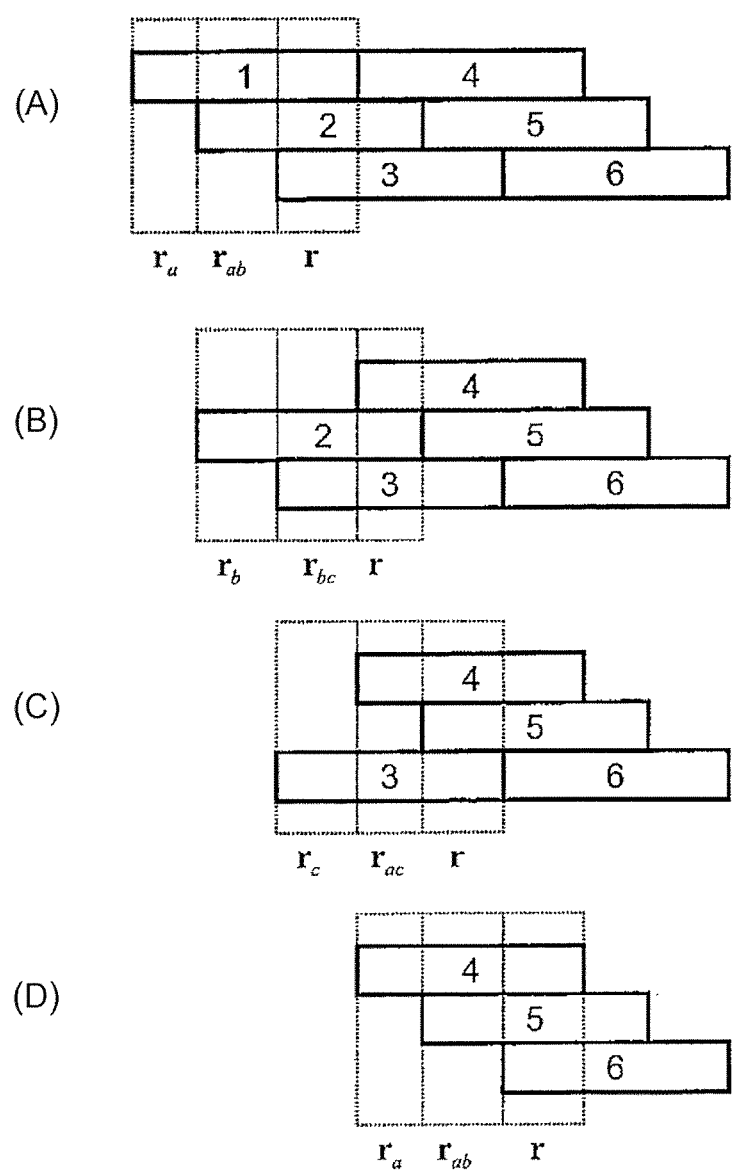
FIGS. 13(A) to 13(D) are diagrams of operations of a MIMO demodulator according to a fourth embodiment.

First, the reception-side wireless communication apparatus demodulates a first frame indicated in FIG. 13(A). Three periods exist in the first frame as illustrated in FIG. 13(A). That is, the three periods include a period when no interference is received, a period when the interference from the second frame is received, and a period when the interference from the second and third frames is received.

When it is assumed that reception signal vectors of the respective periods be $r_a$, $r_{ab}$, and r and $H_a$ in (Mathematical Formula 16), $H_{ab}$ in (Mathematical Formula 18), and H in (Mathematical Formula 13) are used, the periods can be respectively expressed as (Mathematical Formula 17), (Mathematical Formula 19), and (Mathematical Formula 1).

$$\hat{s} = \begin{pmatrix} \hat{s}_1 \\ \hat{s}_2 \\ \hat{s}_3 \end{pmatrix}$$ [Mathematical Formula 15]

$$H_a = \begin{pmatrix} h_{11} & 0 & 0 \\ h_{21} & 0 & 0 \end{pmatrix}$$ [Mathematical Formula 16]

$$r_a = H_a s$$ [Mathematical Formula 17]

$$H_{ab} = \begin{pmatrix} h_{11} & h_{12} & 0 \\ h_{21} & h_{22} & 0 \end{pmatrix}$$ [Mathematical Formula 18]

$$r_{ab} = H_{ab} s$$ [Mathematical Formula 19]

Therefore, a MIMO demodulator 106 can obtain a demodulation signal ŝ (Mathematical Formula 15) by substituting $r_a$ and $H_a$, $r_{ab}$ and $H_{ab}$, and r and H in (Mathematical Formula 13) into H in (Mathematical Formula 6) and r. Here, it is preferable to calculate $s_1$^ corresponding to the first frame. Since $s_2$^ and $s_3$^ are not used, calculation can be omitted. When the demodulation and decoding of the first frame and generation and cancellation of a replica have been completed, the reception signal after the interference has been canceled is as illustrated in FIG. 13(B). The reception-side wireless communication apparatus demodulates a second frame.

Regarding the second frame, three periods exist as illustrated in FIG. 13(B).

That is, the three periods include a period when no interference is received, a period when the interference from the third frame is received, and a period when the interference from the third and fourth frames is received.

When it is assumed that reception signal vectors of the respective periods be $r_b$, $r_{bc}$, and r and $H_b$ in (Mathematical Formula 20), $H_{bc}$ in (Mathematical Formula 22), and H in (Mathematical Formula 13) are used, the vectors can be respectively expressed as (Mathematical Formula 21), (Mathematical Formula 23), and (Mathematical Formula 1).

$$H_b = \begin{pmatrix} 0 & h_{12} & 0 \\ 0 & h_{22} & 0 \end{pmatrix}$$ [Mathematical Formula 20]

$$r_b = H_b s$$ [Mathematical Formula 21]

$$H_{bc} = \begin{pmatrix} 0 & h_{12} & h_{13} \\ 0 & h_{22} & h_{23} \end{pmatrix}$$ [Mathematical Formula 22]

$$r_{bc} = H_{bc} s$$ [Mathematical Formula 23]

Therefore MIMO demodulator 106 can obtain a demodulation signal ŝ (Mathematical Formula 15) by substituting $r_b$ and $H_b$, $r_{bc}$ and $H_{bc}$, and r and H in (Mathematical Formula 13) into H in (Mathematical Formula 6) and r. Here, it is preferable to calculate $s_2$^ corresponding to the second frame. Since $s_1$^ and $s_3$^ are not used, calculation can be omitted.

When the demodulation and decoding of the second frame and generation and cancellation of a replica have been completed, the reception signal after the interference has been canceled is as illustrated in FIG. 13(C). The reception-side wireless communication apparatus demodulates the third frame.

Also, regarding the third frame, three periods exist as illustrated in FIG. 13(C). That is, the three periods include a period when no interference is received, a period when the interference from the fourth frame is received, and a period when the interference from the fourth and fifth frames is received. When it is assumed that reception signal vectors of the respective periods be $r_c$, $r_{ac}$, and r and $H_c$ in (Mathematical Formula 24), $H_{ac}$ in (Mathematical Formula 26), and H in (Mathematical Formula 13) are used, the vectors can be respectively expressed as (Mathematical Formula 25), (Mathematical Formula 27), and (Mathematical Formula 1).

$$H_c = \begin{pmatrix} 0 & 0 & h_{13} \\ 0 & 0 & h_{23} \end{pmatrix}$$ [Mathematical Formula 24]

$$r_c = H_c s$$ [Mathematical Formula 25]

$$H_{ac} = \begin{pmatrix} h_{11} & 0 & h_{13} \\ h_{21} & 0 & h_{23} \end{pmatrix}$$ [Mathematical Formula 26]

$$r_{ac} = H_{ac} s$$ [Mathematical Formula 27]

Therefore, the MIMO demodulator 106 can obtain the demodulation signal ŝ (Mathematical Formula 15) by substituting $r_c$ and $H_c$, $r_{ac}$ and $H_{ac}$, and r and H in (Mathematical Formula 13) into H and r in (Mathematical Formula 6). Here, it is preferable to calculate $s_3$̂ corresponding to the third frame. Since $s_1$̂ and $s_2$̂ are not used, calculation can be omitted.

When the demodulation and decoding of the third frame and generation and cancellation of a replica have been completed, the reception signal after the interference has been canceled is as illustrated in FIG. 13(D). The reception-side wireless communication apparatus demodulates the fourth frame. The demodulation method of the fourth frame is the same as that of the first frame. Sequentially, it is preferable to repeat to similarly perform the demodulation.

In the demodulation method described above, each frame has three periods, i.e., a period when no interference is received, a period when the interference from another frame is received, and a period when the interference from other two frames is received.

Therefore, in each period, a large information amount with no interference, a small information amount with the interference, and a smaller information amount with larger interference can be obtained from each demodulation result. By shifting the frame timing by ⅓ of the frame time, statistically equal channel capacity (transmission rate) for each channel can be achieved.

Also, as described in the third embodiment, it is preferable to control the frame timings so that instantaneous channel capacities (transmission rate) become equal to each other. In this case, it is preferable that the frame timing of the channel which has a relatively large channel capacity is delayed and the frame timing of the channel which has a relatively small channel capacity is advanced by comparing the channel capacities of the three channels.

In the fourth embodiment, a case where the number of transmission antennae is three and the number of reception antennae is two has been described. However, it is obvious that combinations of other number of antennae can be applied to the present invention with similar attitude.

Fifth Embodiment

Next, a fifth embodiment will be described. A system structure of the fifth embodiment is expressed as FIG. 1 similarly to the first embodiment.

In the fifth embodiment, a transmission-side wireless communication apparatus, for example, transmits measurement result of some physical quantity (for example, temperature) at a plurality of points to a reception-side wireless communication apparatus 100. For example, the fifth embodiment can be used as a wireless communication apparatus forming a sensor network. In this case, there are many cases where the transmission data transmitted from the transmission-side wireless communication apparatus has correlation.

About information transmission from separate information sources which have the correlation with each other, Slepian-Wolf theorem has been known. By using the correlation, a signal can be transmitted by using a transmission line with a channel capacity smaller than a sum of the information amounts.

In the present invention, a theoretical capacity of the MAC Capacity Region is realized, and at the same time, a theoretical capacity of the Slepian-Wolf Rate Region can be realized.

Figure 14:
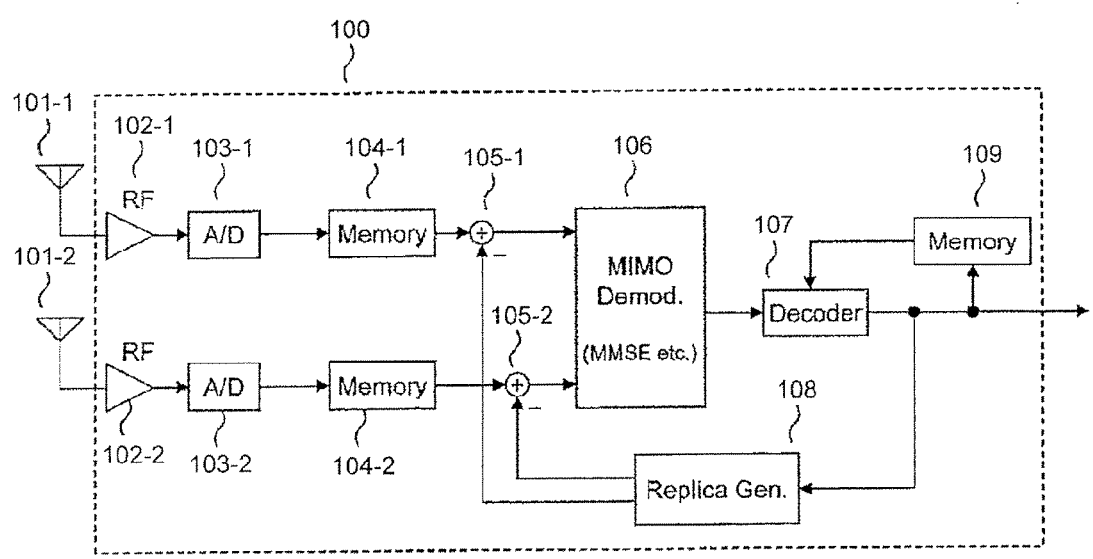
FIG. 14 is a diagram of an exemplary structure of a reception-side wireless communication apparatus according to a fifth embodiment.
Figure 15:
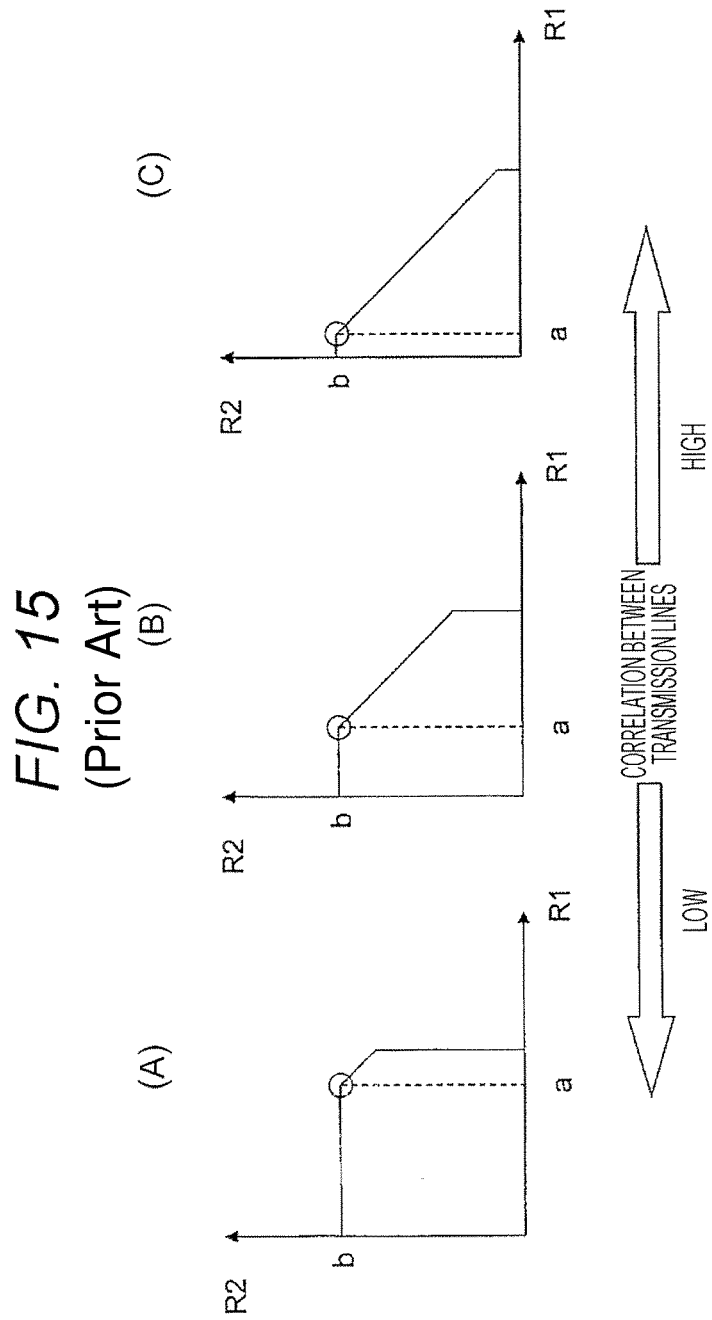
FIGS. 15(A) to 15(C) are diagrams of variation in a channel capacity according to the MAC Capacity Region and the related art.

A structure of the reception-side wireless communication apparatus according to the fifth embodiment is illustrated in FIG. 14. Since reference signs 101 to 106, and 108 are the same as those in the first embodiment, the description will be omitted. A decoder 107 receives information on data having the correlation from the frames in the past stored in a memory 109 and performs decoding by using it as a priori information.

Specifically, in FIG. 5, when the second frame is decoded, the decoding is performed by referring the data having the correlation with the data in the second frame as a priori information. The data having the correlation is in the reception data in the first frame which has been transmitted from the other transmission-side wireless communication apparatus and which has been demodulated and decoded.

Next, when the third frame is decoded, the decoding is performed by referring to the data having the correlation included in the second frame at this time. In this way, the demodulation and decode are sequentially performed by using the decoding result of the sequential temporally-overlapped frames to cancel the interference and correlate the data.

According to the fifth embodiment, both the MAC Capacity Region and the Slepian-Wolf Rate Region can be effectively used. Even when the channel capacity is reduced to be smaller than a predetermined information speed due to the variation of the propagation path during transmission, the reception data can be correctly decoded by using the correlation with the reception data from the other transmission-side wireless communication apparatus.

INDUSTRIAL APPLICABILITY

The present invention relates to a wireless communication apparatus and a wireless communication method, and specifically, can be used for a wireless communication apparatus and a wireless communication method for concurrently transmitting signals from a plurality of antennae.

REFERENCE SIGNS LIST

100: reception-side wireless communication apparatus
101-1, 101-2: reception antenna
102-1, 102-2, 205, 205-1, 205-2: radio frequency circuit
103-1, 103-2: A/D converter
104-1, 104-2, 109, 114-1, 114-2: memory
105-1, 105-2, 113-1, 113-2: adder 106: MIMO demodulator
107: error correction decoder
108: replica generator
110, 202, 202-1, 202-2: (error correction) encoder
111, 203, 203-1, 203-2: modulator
112: propagation path simulator
200: transmission-side wireless communication apparatus
201, 201-1, 201-2: transmission antenna
204, 204-1, 204-2: D/A converter
206: controller
207: distributor
208: beamformer

The invention claimed is:

1. A wireless communication apparatus for receiving a first to third frames, wherein
the first and third frames are sequentially transmitted from a first wireless transmission apparatus, and the second frame is transmitted from a second wireless transmission apparatus different from the first wireless transmission apparatus, or
the first and third frames are sequentially transmitted from a first antenna of a third wireless transmission apparatus, and the second frame is transmitted from a second antenna of the third wireless transmission apparatus,
a transmission head time of the first frame is t1, a transmission head time of the second frame is t2 that is later than t1, and a transmission head time of the third frame is t3 that is later than t2,
a head part of the second frame is overlapped with at least a latter half part of the first frame in terms of time and a terminal part of the second frame is overlapped with at least a first half of the third frame in terms of time,
transmission timings of the first to third frames are synchronized with each other,
the wireless communication apparatus is configured to receive the first frame, to decode the first frame in a receiver, to generate a first reception signal replica based on the first decoding result and to store the first reception signal replica in a storage unit in the receiver, and
the wireless communication apparatus is configured to receive the second frame in a second reception signal, to subtract the stored first reception signal replica from the second reception signal, and to decode the subtracted reception signal to obtain data of the second frame.

2. The wireless communication apparatus according to claim 1, wherein
in the second frame, interference of a wireless signal from the first frame is canceled, and the second frame is demodulated in a state where the interference from the third frame remains.

3. The wireless communication apparatus according to claim 1, wherein
correlation information between data of the first frame and data of the second frame is used when the second frame is decoded.

4. The wireless communication apparatus according to claim 1, wherein
relative time of t2 relative to the t1 and t3 is controlled according to a channel capacity or channel quality regarding a first channel used for communication of the first and third frames and a second channel used for communication of the second frame.

5. The wireless communication apparatus according to claim 1, wherein
when the second frame is decoded, decoding is performed by referring data having correlation with data in the second frame from among reception data in the first frame to which demodulation and decoding have already been completed as previous information, and
when the third frame is decoded, decoding is performed by referring data having correlation with data in the third frame from among reception data in the second frame to which the demodulation and decoding have already been performed as previous information.

6. A wireless communication method for receiving/transmitting first to third frames, wherein
the first and the third frames are sequentially transmitted,
a transmission head time of the first frame is t1, a transmission head time of the second frame is t2 that is later than 0, and a transmission head time of the third frame is t3 that is later than t2,
a head part of the second frame is overlapped with at least a latter half part of the first frame in terms of time and a terminal part of the second frame is overlapped with at least a first half of the third frame in terms of time,
transmission timings of the first to third frames are synchronized with each other,
the first frame is received and decoded in a receiver, and a first reception signal replica is generated based on the first decoding result, and
the second frame is received in a second reception signal, and the first reception signal replica is subtracted from the second reception signal, and the subtracted reception signal is decoded to obtain data of the second frame.

7. The wireless communication method according to claim 6, wherein
in the second frame, interference of a wireless signal from the first frame is canceled, and the second frame is demodulated in a state where the interference from the third frame remains.

8. The wireless communication method according to claim 6, wherein
relative time of t2 relative to the t1 and t3 is controlled according to a channel capacity or channel quality regarding a first channel used for communication of the first and third frames and the first channel used for communication of the second frame.

9. The wireless communication method according to claim 6, wherein
correlation information between data of the first frame and data of the second frame is used when the second frame is decoded.

10. The wireless communication method according to claim 6, wherein
when the second frame is decoded, decoding is performed by referring data having correlation with data in the second frame from among reception data in the first frame to which demodulation and decoding have already been completed as previous information, and
when the third frame is decoded, decoding is performed by referring data having correlation with data in the third frame from among reception data in the second frame to which the demodulation and decoding have already been performed as previous information.

* * * * *